US012621719B2

(12) United States Patent
Grayson et al.

(10) Patent No.: US 12,621,719 B2
(45) Date of Patent: May 5, 2026

(54) CONFLICT MANAGEMENT IN A SHARED O-RAN ARCHITECTURE

(71) Applicant: Cisco Technology, Inc., San Jose, CA (US)

(72) Inventors: Mark Grayson, Berkshire (GB); Indermeet Singh Gandhi, San Jose, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 371 days.

(21) Appl. No.: 18/336,641

(22) Filed: Jun. 16, 2023

(65) Prior Publication Data

US 2024/0422622 A1 Dec. 19, 2024

(51) Int. Cl.
H04W 28/16 (2009.01)
H04W 72/53 (2023.01)
H04W 92/10 (2009.01)

(52) U.S. Cl.
CPC ........... H04W 28/16 (2013.01); H04W 72/53 (2023.01); *H04W 92/10* (2013.01)

(58) Field of Classification Search
CPC ...... H04W 28/16; H04W 72/53; H04W 92/10
See application file for complete search history.

(56) References Cited

U.S. PATENT DOCUMENTS

2021/0204148 A1 7/2021 Chou et al.
2022/0303196 A1 9/2022 Giust et al.

2022/0369404 A1* 11/2022 Gundavelli ........... H04W 76/15
2024/0106582 A1* 3/2024 Sun ........................ H04W 16/14
2024/0163649 A1* 5/2024 Akman ................. H04W 24/04
2024/0236691 A1* 7/2024 Bonati .................. H04W 24/02
2024/0259879 A1* 8/2024 Ranganath .......... H04L 41/5054

(Continued)

FOREIGN PATENT DOCUMENTS

WO 2022211467 A1 10/2022

OTHER PUBLICATIONS

Michele Polese, et al., "Understanding O-RAN: Architecture, Interfaces, Algorithms, Security, and Research Challenges," IEEE, arXiv:2202.01032v2 [cs.NI], Aug. 1, 2022, 33 pages.

(Continued)

*Primary Examiner* — Melanie Jagannathan

(74) *Attorney, Agent, or Firm* — Edell, Shapiro & Finnan, LLC

(57) ABSTRACT

Provided herein are techniques to facilitate conflict management in a shared Open Radio Access Network (O-RAN) architecture. In one instance, a method can be performed by a conflict manager of a near-real-time RAN intelligent controller of a shared RAN including radio unit (RU) nodes provided by a host operator. The method can include obtaining each of a requested radio unit (RU) configuration from each of a distributed unit (DU) node operated by each of a tenant operator and determining whether there are any conflicts among RU configuration parameters for each requested RU configuration. In one instance, upon determining one or more conflicts among the RU configuration parameters for each requested RU configuration, the method may include providing a response to each DU node indicating that each DU node is allowed to configure the plurality of RU nodes using each requested RU configuration in accordance with a modification.

20 Claims, 5 Drawing Sheets

(56) References Cited

U.S. PATENT DOCUMENTS

| | | | | |
|---|---|---|---|---|
| 2024/0267839 A1* | 8/2024 | Cui | ..................... | H04L 41/0896 |
| 2024/0276298 A1* | 8/2024 | Chauhan | ........... | H04W 28/0858 |
| 2024/0284436 A1* | 8/2024 | Kak | ...................... | H04W 24/02 |
| 2025/0048342 A1* | 2/2025 | Xie | ....................... | H04W 24/02 |
| 2025/0234183 A1* | 7/2025 | Song | .................... | H04W 24/02 |
| 2025/0240808 A1* | 7/2025 | Yang | ................... | H04B 17/328 |

OTHER PUBLICATIONS

Marcin Dryjanskim "O-RAN Overview, Architecture, near-Real-Time RIC and Use Cases," Linkedin, https://www.linkedin.com/pulse/o-ran-overview-architecture-near-real-time-ric-use-cases-dryjanski, May 21, 2023, 13 pages.
Mark Grayson, et al. "Real-Time Coordination Between Shared Schedulers in an O-RAN Architecture," Technical Disclosure Commons, https://www.tdcommons.org/dpubs_series/5112, May 3, 2022, 4 pages.
Salvatore D'Oro, et al., "OrchestRAN: Network Automation through Orchestrated Intelligence in the Open RAN," IEEE International Conference on Computer Communications, arXiv:2201.05632v1 [cs.NI], Jan. 14, 2022, 10 pages.
"O-RAN Working Group 3 (Near-Real-time RAN Intelligent Controller and E2 Interface Workgroup) Near-RT RIC Architecture," O-RAN Alliance, O-RAN.WG3.RICARCH-R003-v04.00, Rev. 02.01.09, Aug. 1, 2022, 105 pages.
O-RAN Operations and Maintenance Architecture, O-Ran Alliance, O-RAN.WG1.OAM-Architecture-v05.00, 2021, 73 pages.

* cited by examiner

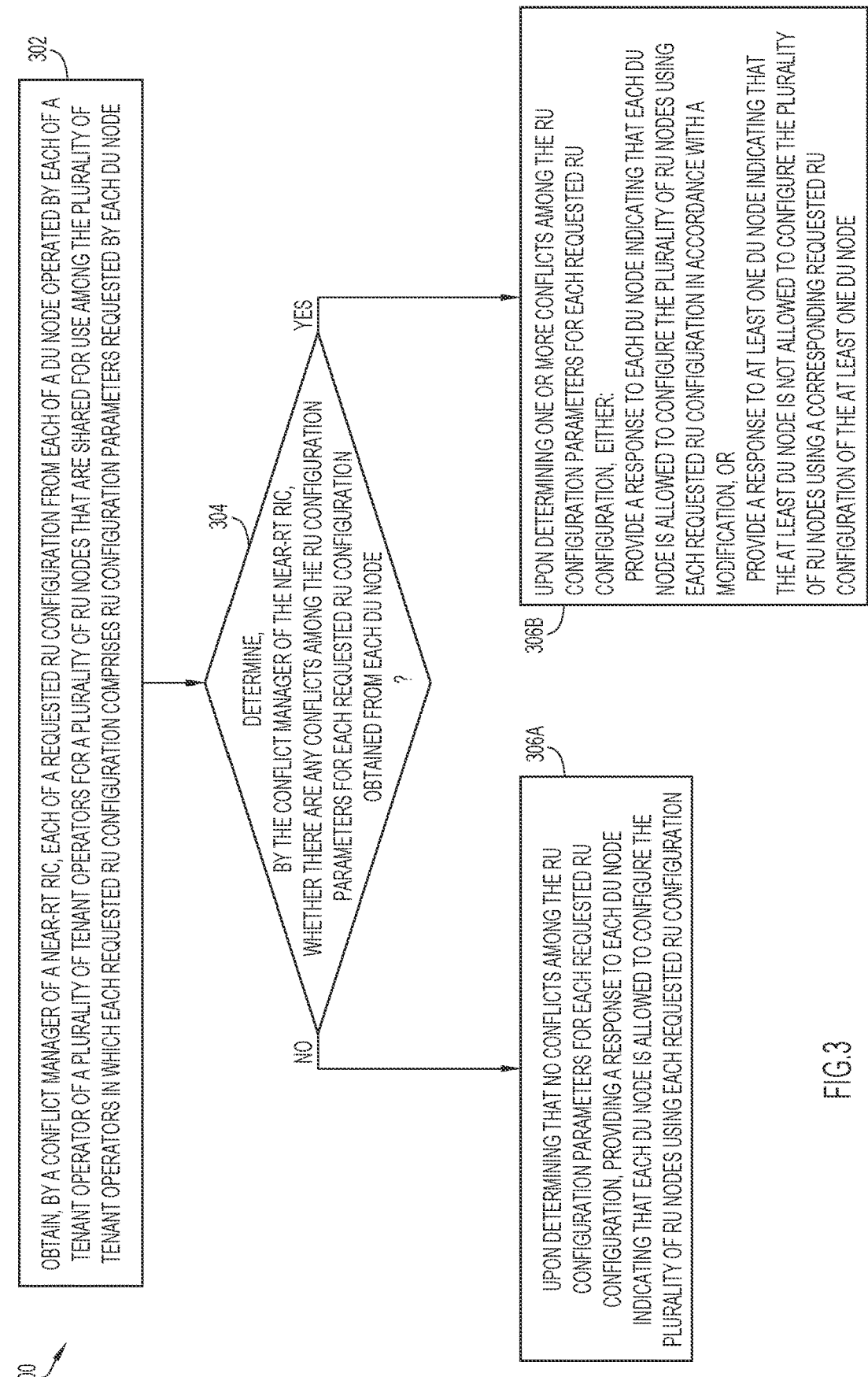

300

302

OBTAIN, BY A CONFLICT MANAGER OF A NEAR-RT RIC, EACH OF A REQUESTED RU CONFIGURATION FROM EACH OF A DU NODE OPERATED BY EACH OF A TENANT OPERATOR OF A PLURALITY OF TENANT OPERATORS FOR A PLURALITY OF RU NODES THAT ARE SHARED FOR USE AMONG THE PLURALITY OF TENANT OPERATORS IN WHICH EACH REQUESTED RU CONFIGURATION COMPRISES RU CONFIGURATION PARAMETERS REQUESTED BY EACH DU NODE

304

DETERMINE,
BY THE CONFLICT MANAGER OF THE NEAR-RT RIC,
WHETHER THERE ARE ANY CONFLICTS AMONG THE RU CONFIGURATION
PARAMETERS FOR EACH REQUESTED RU CONFIGURATION
OBTAINED FROM EACH DU NODE
?

NO

YES

306A

UPON DETERMINING THAT NO CONFLICTS AMONG THE RU CONFIGURATION PARAMETERS FOR EACH REQUESTED RU CONFIGURATION, PROVIDING A RESPONSE TO EACH DU NODE INDICATING THAT EACH DU NODE IS ALLOWED TO CONFIGURE THE PLURALITY OF RU NODES USING EACH REQUESTED RU CONFIGURATION

306B

UPON DETERMINING ONE OR MORE CONFLICTS AMONG THE RU CONFIGURATION PARAMETERS FOR EACH REQUESTED RU CONFIGURATION, EITHER:
  PROVIDE A RESPONSE TO EACH DU NODE INDICATING THAT EACH DU NODE IS ALLOWED TO CONFIGURE THE PLURALITY OF RU NODES USING EACH REQUESTED RU CONFIGURATION IN ACCORDANCE WITH A MODIFICATION, OR
  PROVIDE A RESPONSE TO AT LEAST ONE DU NODE INDICATING THAT THE AT LEAST DU NODE IS NOT ALLOWED TO CONFIGURE THE PLURALITY OF RU NODES USING A CORRESPONDING REQUESTED RU CONFIGURATION OF THE AT LEAST ONE DU NODE

FIG.3

COMPUTING DEVICE

CONTROL LOGIC 420

CONFLICT MANAGER LOGIC 422

I/O 416

I/O

I/O 432

RF TRANSCIEVER(s) 412

414

BASEBAND PROCESSOR(s) (MODEM(s)) 410

NEWORK PROCESSOR UNIT(s) 430

408

STORAGE 406

MEMORY ELEMENT(s) 404

PROCESSOR(s) 402

400

CONFLICT MANAGEMENT IN A SHARED O-RAN ARCHITECTURE

TECHNICAL FIELD

The present disclosure relates to network equipment and services.

BACKGROUND

Networking architectures have grown increasingly complex in communications environments, particularly mobile networking environments. In particular, virtualized Radio Access Network (vRAN) architectures have been developed to provide radio coverage for mobile networks. However, there are significant challenges in facilitating operation among elements of vRAN architectures.

BRIEF DESCRIPTION OF THE DRAWINGS

FIG. 3 is a flowchart depicting a method according to an example embodiment.

DETAILED DESCRIPTION

Overview

Figure 1:
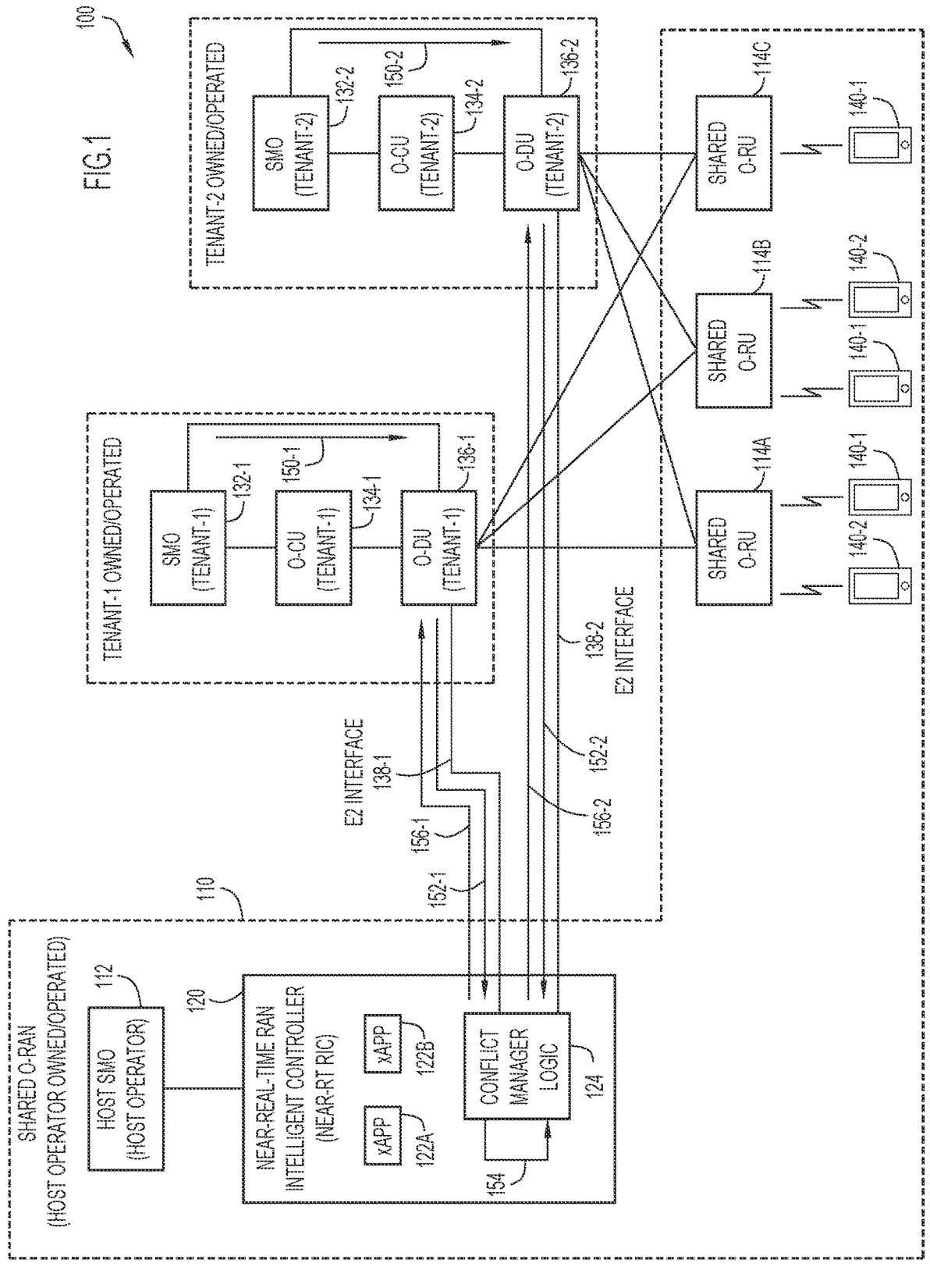
FIG. 1 is a block diagram of a system that may be used to facilitate conflict management in a shared Open Radio Access Network (O-RAN) architecture, according to an example embodiment.

The current Open Radio Access Network (O-RAN) Alliance Network Configuration (NETCONF) protocol configuration model does not handle or provide conflict management capabilities for scenarios in which multiple shared O-RAN Radio Unit (O-RU) configurations may be requested by multiple tenant operators utilizing shared O-RUs in a shared O-RAN architecture. As a result, shared O-RU operations may have negative implications when multiple tenants have conflicting O-RU configuration demands (statically or dynamically).

Provided herein are embodiments through which a new capability can be provided through conflict manager logic configured for a near-real-time Radio Access Network (RAN) Intelligent Controller (near-RT) RIC in which the conflict manager logic/near-RT RIC can interface via each of a corresponding E2 interface with each of a corresponding O-RAN Distributed Unit (O-DU) operated/owned by each of a corresponding different tenant operator in order to facilitate conflict management functionality for a shared O-RAN architecture. Broadly, for example, shared O-RU configuration requests including corresponding O-RU configuration parameters can be sent by each O-DU to the conflict manager logic, which can validate the requests by determining whether any conflicts exist among the O-RU configurations/parameters and/or whether the shared O-RU configurations/parameters are permitted. A response can be sent to each O-DU indicating whether each shared O-RU configuration requested by each O-DU is allowed, is allowed with a recommended modification (e.g., is allowed to be utilized in accordance with a sharing schedule) or is not allowed. Other features/embodiments are discussed herein.

In at least one embodiment, a computer-implemented method is provided that may be performed by a conflict manager of a near-RT RIC of a shared RAN including a plurality of RU nodes in which the shared RAN is provided by a host operator may be provided in which the method includes obtaining each of a requested RU configuration from each of a DU node operated by each of a tenant operator of a plurality of tenant operators for the plurality of RU nodes that are shared for use among the plurality of tenant operators, wherein each requested RU configuration comprises RU configuration parameters requested by each DU node; determining whether there are any conflicts among the RU configuration parameters for each requested RU configuration obtained from each DU node; upon determining no conflicts among the RU configuration parameters for each requested RU configuration, providing a response to each DU node indicating that each DU node is allowed to configure the plurality of RU nodes using each requested RU configuration; and upon determining one or more conflicts among the RU configuration parameters for each requested RU configuration, either: providing a response to each DU node indicating that each DU node is allowed to configure the plurality of RU nodes using each requested RU configuration in accordance with a modification; or providing a response to at least one DU node indicating that the at least DU node is not allowed to configure the plurality of RU nodes using a corresponding requested RU configuration of the at least one DU node.

Example Embodiments

Generally, a disaggregated Radio Access Network (RAN) architecture can include the splitting of a base station, such as a gNB, into multiple components or nodes offering different levels or layers of functionality/operations, such as a Central (or Centralized) Unit (CU), one or several Distributed Units (DUs), and one or several Radio Units (RUs). DUs may be referred to herein interchangeably as DU components or nodes and RUs may be referred to interchangeably as RU components or nodes. For a RAN architecture, one or more RU(s) can interface with a DU component, which further can further interface with a CU, which, in some instances can be further disaggregated into a control plane CU (CU-CP) component and a user plane CU (CU-UP) component.

A disaggregated RAN architecture provides an option to virtualize higher layer RAN functions and provides new business opportunities for shared host operators who can provide services via a shared RAN architecture to multiple different tenant operators. Shared RAN architectures are being studied by the Open Radio Access Network (O-RAN) Alliance for various O-RAN standards.

For a RAN architecture implemented according to O-RAN standards (e.g., an O-RAN architecture), an RU can be implemented as an ORAN-RU (O-RU), a DU can be implemented as an ORAN-DU (O-DU), and a CU can be implemented as an ORAN-CU (O-CU) (and, potentially, an O-CU-CP and an O-CU-UP if further disaggregated). Further for an O-RAN architecture, a Service Management and Orchestration (SMO) component or node can interface with an O-CU, an O-DU, and an O-RU, where the O-CU further interface with one or more O-DUs, which can further interface with one or more O-RUs.

Current RAN sharing mechanisms typically involve RU sharing (or O-RU sharing, for a shared O-RAN architecture). The current O-RU sharing mechanism provided by O-RAN standards does not cover dynamic sharing of near-real-time RAN Intelligent Controller (near-RT RIC) applications/resources by multiple tenant operators, rather the current O-RU sharing mechanism involves providing separate near-RT RIC instances that are usually hosted or owned by individual tenant operators in which each tenant operator (e.g., tenant mobile network operator (MNO)) is responsible for managing its own statically allocated resources. Thus, the current O-RAN sharing model makes conflict mitigation an extremely improbable task.

Consider, for example, a scenario in which a given tenant operator for a shared RAN operating the hierarchical mode (in which each tenant operates an SMO, O-CU, and O-DU to control shared O-RUs) such that the given tenant operator makes a configuration change to alter the antenna tilt (e.g., azimuth and/or elevation) of a given shared O-RU or the time-division duplexing (TDD) frame format of Radio Frequency (RF) communications. This will affect the operation of the shared O-RU, which, in turn, will also affect the shared host operator that may be using the shared O-RU as well as other tenant operators that may be using the shared O-RU.

As prescribed by the O-RAN standard O-RAN.WG3.RICARCH-R003-v04.00, "O-RAN Working Group 3 (Near-Real-time RAN Intelligent Controller and E2 Interface Workgroup)," revision 02.01.09, published 2022 Aug. 1 (referred to herein as "O-RAN near-RT RIC standard"), a near-RT RIC can provide conflict management among applications (referred to as "xApps") configured for the near-RT RIC via E2 Guidance Procedures. However, the O-RAN near-RT RIC standard and corresponding standards-based E2 Guidance Procedures do not describe providing conflict management among multiple shared O-RUs in a shared O-RAN architecture. Further, the current O-RAN near-RT RIC standards do not describe how conflict management can be resolved when xApps belong to different tenants.

In accordance with embodiments herein, a conflict management capability is introduced for a shared O-RAN architecture that provides for the ability to guide multiple O-DUs operated by each of multiple tenant operators in order to validate or update a desired O-RU configuration requested by each of a given O-DU/tenant operator with regard to its effect on a shared O-RU. Such a conflict management capability as provided through embodiments herein can aid conflict management in both static and dynamic sharing modes.

Referring to FIG. 1, FIG. 1 is a block diagram of a system 100 that may be used to facilitate conflict management for a shared Open Radio Access Network (O-RAN) architecture, according to an example embodiment. FIG. 1 includes a shared O-RAN 110 that is owned/operated or otherwise provided by a host operator (e.g., a host MNO) in which the shared O-RAN includes a host Service Management and Orchestration (SMO) 112, a near-real-time RAN Intelligent Controller (near-RT RIC) 120, and a number of shared O-RUs, such as a shared O-RU 114A, a shared O-RU 114B, and a shared O-RU 114C.

The near-RT RIC 120 can be configured with a number of applications that, for an O-RAN architecture, can be implemented as xApplications (xApp), such as an xApp 122A and an xApp 122B. The near-RT RIC 120 can further be configured with conflict manager logic 124 that may perform various conflict management operations discussed for various embodiments herein.

For shared O-RAN of system 100, use of each of the shared O-RUs 114A, 114B, and 114C can be shared among multiple tenant operators, such as a first tenant operator (Tenant-1) and a second tenant operator (Tenant-2), as shown in FIG. 1. It is to be understood that any number of two or more tenant operators may be present for system 100.

As shown in FIG. 1, Tenant-1 may own/operate or otherwise provide an SMO 132-1. an O-CU 134-1, and an O-DU 136-1 in order to facilitate RF communications via use of any of shared O-RUs 114A, 114B, and/or 114C for a number of Tenant-1 wireless devices that may be present in shared O-RAN 110, such as wireless devices 140-1. Thus, SMO 132-1 can interface with O-CU 134-1 and O-DU 136-1 to enable management operations, where O-CU 134-1 can further interface with O-DU 136-1 to enable control and user-plane operations, and O-DU 136-1 can further interface with each of shared O-RUs 114A, 114B, and 114C.

Similarly, Tenant-2 may own/operate or otherwise provide an SMO 132-2, an O-CU 134-2, and an O-DU 136-2 in order to facilitate RF communications via use of any of shared O-RUs 114A, 114B, and/or 114C for a number of Tenant-2 wireless devices that may be present in shared O-RAN 110, such as wireless devices 140-2. Thus, SMO 132-2 can interface with O-CU 134-2 and O-DU 136-2 to enable management operations, where O-CU 134-2 can further interface with O-DU 136-2 to enable control and user-plane operations, and O-DU 136-1 can further interface with each of shared O-RUs 114A, 114B, and 114C.

Although not shown in FIG. 1, it is to be understood that each of SMO 132-1 and O-CU 134-1 of Tenant-1 and SMO 132-2 and O-CU 134-2 can further interface with a mobile core network (e.g., a Third Generation Partnership Project (3GPP) mobile core network) that can facilitate data communications (e.g., voice, video, gaming, etc. communications), via shared O-RAN 110, between wireless devices 140-1 and/or 140-2 and one more data networks, such as the public Internet, an enterprise network, and/or any other applicable data networks that may exchange data communications with wireless devices 140-1 and/or 140-2.

The interface between O-DU 136-1 and each of shared O-RUs 114A, 114B, and 114C and between O-DU 136-2 and each of shared O-RUs 114A, 114B, and 114C can be referred to as a fronthaul interface that may facilitate a management plane (MP) and a data plane (DP) in which the MP can be utilized to facilitate management/configuration of the shared O-RUs 114A, 114B, and 114C by each of O-DU 136-1 and O-DU 136-2 and the DP can be utilized to facilitate data communications for wireless devices (e.g., wireless devices 140-1 and 140-2).

Although the host operator for the embodiment of FIG. 1 is assumed to own/operate the shared O-RUs 114A, 114B, and 114C of shared O-RAN 110, along with host SMO 112 and near-RT RIC 120, it is assumed that the host operator may not use the shared O-RUs 114A, 114B, and 114C to facilitate RF communications with wireless devices of the host operator. Rather, the host operator may be considered a neutral host that facilitates use of the shared O-RUs 114A, 114B, and 114C among the tenant operators, Tenant-1 and Tenant-2. However, it is to be understood that features/operations discussed for embodiments herein can be extended to a scenario in which the host operator that owns/operates or otherwise provides the shared O-RAN 110 may also have its own O-CU and O-DU that may interface with each of the shared O-RUs 114A, 114B, and 114C in order to use the shared O-RUs to facilitate RF communications for wireless devices of the host operator (e.g., the host operator may also be an MNO similar to tenant operators).

Host SMO 112 can interface with near-RT RIC 120 in which the near-RT RIC 120/conflict manager logic 124 can further interface with each O-DU owned/operated or otherwise provided by each of the multiple tenant operators via a corresponding O-RAN E2 interface that can facilitate O-RAN E2 Application Protocol (E2AP) communications that can be enhanced in accordance with embodiments herein to facilitate various enhanced E2 Guidance Procedures discussed herein, below. As shown in FIG. 1, near-RT RIC 120/conflict manager logic 124 can interface via an (enhanced) E2 interface 138-1 with O-DU 136-1 owned/ operated or otherwise provided by Tenant-1 and can interface via an (enhanced) E2 interface 138-2 with O-DU 136-2 owned/operated or otherwise provided by Tenant-2. Each of E2 interface 138-1 and E2 interface 138-2 can be configured to facilitate communications with the near-RT RIC 120/ conflict manager logic 124 via enhanced E2AP E2 Guidance Procedure communications, as discussed for embodiments herein.

Generally, host SMO 112 may operate as a non-real-time RIC (non-RT RIC) in order to manage the configuration, provisioning, etc. of near-RT RIC 120 and shared O-RUs 114A, 114B, and 114C in accordance with O-RAN standards, such as O-RAN.WG.1.OAM-Architecture-v.05.00, "O-RAN Operations and Maintenance Architecture," published 2021 (referred to herein as "O-RAN OAM standard". Generally, near-RT RIC 120 may operate to enable near-real-time control and/or optimization of shared O-RAN 110 in which xApps 122A and 122B may perform specific functionality for the shared O-RAN 110, such as supporting handovers, roaming, etc.

In accordance with embodiments herein, a conflict management function can be provided for the shared O-RAN 110, such as conflict manager logic 124 that can reside within/be configured for near-RT RIC 120, in which the conflict manager logic 124 can operate to mitigate configuration related conflicts when shared O-RUs, such as shared O-RUs 114A, 114B, and 114C, are shared between multiple tenants, such as between Tenant-1 and Tenant-2, and/or hosts, in both static and dynamic sharing modes.

Currently, the O-RAN near-RT RIC standard defines that an E2 Guidance Request can be used by xApps internal to a near-RT RIC for performing standards-based conflict management among xApps configured for the near-RT RIC.

In accordance with embodiments herein, the O-RAN E2 Guidance Procedures, such as E2 Guidance Request messaging (and other E2 Guidance messaging discussed herein, below), can be enhanced to extend outside of near-RT RIC 120 so that each of corresponding O-DU 136-1 and O-DU 136-2 operated by each of corresponding Tenant-1 and Tenant-2 can initiate an O-RU configuration request towards the conflict manager logic 124 via each of corresponding E2 interface 138-1 and E2 interface 138-2 in order to validate an O-RU configuration for each of shared O-RUs 114A, 114B, and 114C as requested by each of corresponding O-DU 136-1 of Tenant-1 and O-DU 136-2 of Tenant-2.

Broadly during operation of system 100, conflict management can be provided for the use of shared O-RUs 114A, 114B, and 114C by each of Tenant-1 and Tenant-2 through conflict management procedures facilitated by conflict manager logic 124 via each of E2 interface 138-1 configured for near-RT RIC 120/conflict manager logic 124 and O-DU 136-1 owned/operated or otherwise provided by Tenant-1 and E2 interface 138-2 configured for near-RT RIC 120/ conflict manager logic 124 and O-DU 136-2 owned/operated or otherwise provided by Tenant-2.

For example, during operation, each of corresponding Tenant-1 SMO 132-1 and Tenant-2 SMO 132-2 can provide a corresponding shared O-RU configuration to each of corresponding O-DU 136-1 and O-DU 136-2 for the fronthaul interface, as generally shown at operations 150-1 and 150-2 (which can be facilitate via communications with each of corresponding O-CU 134-1 and O-CU 134-2). In various embodiments, a shared O-RU configuration may include various O-RU configuration parameters, such as carrier configuration information, frequency bands, number of transmit (tx)/receive (rx) array, antenna tilt and/or azimuth, beamforming (e.g., fine, coarse, etc.), time-division duplex (TDD) frame format (e.g., DDDDU, DDDUU, etc., defining downlink (D) and uplink (U) subframes), combinations thereof, and/or any other applicable shared O-RU configuration information that may be requested/desired by a given tenant operator.

Rather than each of corresponding O-DU 136-1 of Tenant-1 and O-DU 136-2 of Tenant-2 sending each corresponding shared O-RU configuration directly to each shared O-RU 114A, 114B, and 114C over the fronthaul MP, each of O-DU 136-1 and O-DU 136-2 can be enhanced to initiate, via each of corresponding E2 interface 138-1 and E2 interface 138-2, a corresponding E2 Guidance Request message toward the conflict manager logic 124, as generally shown at 152-1 and 152-2, in order to trigger the conflict manager logic 124 to validate each corresponding shared O-RU configuration requested by each of corresponding Tenant-1/O-DU 136-1 and Tenant-2/136-2.

As generally shown at 154, the conflict manager logic 124 can check or validate the corresponding requested shared O-RU configurations obtained from each of corresponding Tenant-1/O-DU 136-1 and Tenant-2/O-DU 136-2 to determine whether either requested shared O-RU configuration/ O-RU configuration parameters affects the other tenant's requested configuration/operation and/or may determine whether each requested shared O-RU configuration/RU configuration parameters is/are permitted.

For example, the Tenant-1/O-DU 136-1 may desire to operate with one or more transmit array carriers Tx-Array-Carrier-1 and Tx-Array-Carrier-2 with a configured gain-1 of Tx-Array-Carrier-1 and gain-2 of Tx-Array-Carrier-2, and the separate Tenant-2/O-DU 136-2 may desire to operate with one or more transmit array carriers Tx-Array-Carrier-3 and Tx-Array-Carrier-4 with a configured gain-3 of Tx-Array-Carrier-3 and gain-4 of Tx-Array-Carrier-4. Thus, in this example, the cumulative gain of gain-1, gain-2, gain-3 and gain-4 exceeds the maximum gain supported by the shared O-RU and, thus, would not be permitted.

Based on the validation operations performed at 154, the conflict manager logic 124 can provide an enhanced E2 Guidance Response message to each of corresponding O-DU 136-1 and O-DU 136-2 via each of corresponding E2 interface 138-1 and E2 interface 138-2, as generally shown at 156-1 and 156-2 that can be enhanced to indicate whether each corresponding shared O-RU configuration requested by each of corresponding O-DU 136-1 and O-DU 136-2 is allowed (e.g., indicated via an Acknowledgment (ACK) indicating 'success'), is allowed with a recommended modification, or is not allowed (e.g., indicated via a non-Acknowledgment (NACK) indicating 'failure').

In some instances, the conflict manager logic 124 may determine that corresponding shared O-RU configurations requested by each of corresponding O-DU 136-1 and O-DU 136-2 may both be allowed if both were configured for the shared O-RUs 114A, 114B, and 114C in accordance with a modification, such as a sharing schedule. E2 Guidance Modification messages can be used by conflict manager logic 124 in order to address or ovoid potential conflicts between different tenant configurations. Thus, in such instances, conflict manager logic 124 may indicate that requested O-RU configurations are allowed by sending both O-DU 136-1 and O-DU 136-2 a corresponding E2 Guidance Response message including an ACK/success indication along with a corresponding E2 Guidance Modification message that can be enhanced to include a recommendation for a sharing schedule that each corresponding O-DU 136-1 and O-DU 136-2 is to follow in configuring the shared O-RUs 114A, 114B, and 114C. In various embodiments, a sharing schedule can be indicated via an enhanced E2 Guidance Modification message as an 'n' number of time slots, an 'n' number of days, after a time 't', for a time period 'Tp', combinations thereof, and/or any other appropriate scheduling information that can identify a sharing schedule to an O-DU.

Consider, for example, an example scenario in which Tenant-1/O-DU 136-1 requests a first TDD frame format configuration for shared O-RUs 114A, 114B, and 114C and Tenant-2/O-DU 136-2 requests a second TDD frame format configuration for shared O-RUs 114A, 114B, and 114C such that a conflict is determined by conflict manager logic 124 for the requested TDD frame formats.

For example, currently operators may seek to dynamically vary the TDD frame format depending on the traffic demand between downlink and uplink communications with wireless devices. Thus, for the example scenario consider that Tenant-1/O-DU 136-1 requests a shared O-RU configuration for a TDD frame format of "DDDDU" in order to accommodate downlink heavy demand, whereas Tenant-2/O-DU 136-2 requests a shared O-RU configuration for a TDD frame format of "DDDUU" in order to accommodate a downlink and uplink mix. However, in shared O-RU mode this causes conflict.

Thus, in this example scenario the conflict manager logic 124 can validate the requested TDD frame format sent by each of Tenant-1/O-DU 136-1 and Tenant-2/O-DU 136-2 and may normalize and recommend that each requested TDD frame format can be used by each of Tenant-1/O-DU 136-1 and Tenant-2/O-DU 136-2 in accordance with a modification, such as sharing schedule (e.g., 'n' time slots, 'n' days, after time 't', for a time period 'Tp', etc.). For example, conflict manager logic 124 may provide an E2 Guidance Response to O-DU 136-1 indicating that Tenant-1/O-DU 136-1 can configure shared O-RUs 114A-114C to utilize a TDD frame format of "DDDDU" (e.g., E2 Guidance Response (ACK or Success)) along with an E2 Guidance Modification that indicates that the configuration is allowed for a given sharing schedule that can indicated as the next 'n' time slots, the next 'n' days, etc. for which the configuration can be utilized by the O-DU 136-1 (e.g., E2 Guidance Modification (Recommendations: after 'n' time slots/days, within one or more time-windows, etc.). Conflict manager logic 124 can also provide an E2 Guidance Response to O-DU 136-2 indicating that Tenant-2/O-DU 136-2 can configure shared O-RUs 114A-114C to utilize a TDD frame format of "DDDUU" (e.g., E2 Guidance Response (ACK or Success)) along with an E2 Guidance Modification indicating that the configuration is allowed for another given sharing schedule that can be indicated as other time slots, other days, etc. for which the configuration can be utilized by the O-DU 136-2.

One example in which no modification might be suggested might involve an outdoor scenario in which the host operator has deployed an O-RU in a TDD frame configuration in the outdoor scenario that requires an LTE configuration of (#2) DSUDDDSUDD (with 'S' identifying special subframes) but a tenant operator requests a TDD configuration (#6) of DSUUUDSUUD. In this example, the conflict manager logic 124 could simply NACK the request of the tenant operator as not permitted.

Accordingly, the conflict manager logic 124 can indicate to a given tenant O-DU for a given requested shared O-RU configuration that the given tenant O-DU can make an O-RU configuration change/update with or without modifications by sending either a success indication (e.g., ACK) or a partial success indication (e.g., ACK+modification) to the tenant O-DU, which can be relayed to the tenant SMO. Conversely, the conflict manager logic 124 can indicate to a given tenant O-DU for a given requested shared O-RU configuration that the given tenant O-DU cannot make an O-RU configuration change/update by sending a failure indication (e.g., NACK) to the tenant O-DU, which can be relayed to the tenant SMO.

In some embodiments, the conflict manager logic 124 can also check to determine whether each requested shared O-RU configuration obtained by conflict manager logic 124 may have any negative outcome of the intent/functionality for which the xApps 122A and 122B are trying to optimize. For example, if xApp 122A is trying to optimize coverage and a particular request for an O-RU configuration requests to tilt the antenna for narrow beam or reduce the number of tx and rx array, such a configuration change request would be in conflict with the xApp's goals and would be rejected/not permitted.

Thus, in accordance with embodiments herein, the O-RAN E2 Guidance Procedures can be enhanced to extend outside the near-RT RIC 120 to facilitate conflict management operations to be performed for each of O-DU 136-1 and O-DU 136-2 via each of corresponding E2 interface 138-1 and E2 interface 138-2 facilitating corresponding enhanced E2AP interface communications between each of O-DU 136-I/O-DU 136-2 and conflict manager logic 124 of near-RT RIC 120. As traffic demand can change (DL/UL mix) and/or of there is a need for a tenant operator to update its shared O-RU configuration, the operations provided in accordance with embodiments herein can be used both statically and dynamically (for static configurations and dynamically updated configurations) to avoid conflicts among shared O-RU configurations requested/sought be the tenant operators.

Figure 2A:
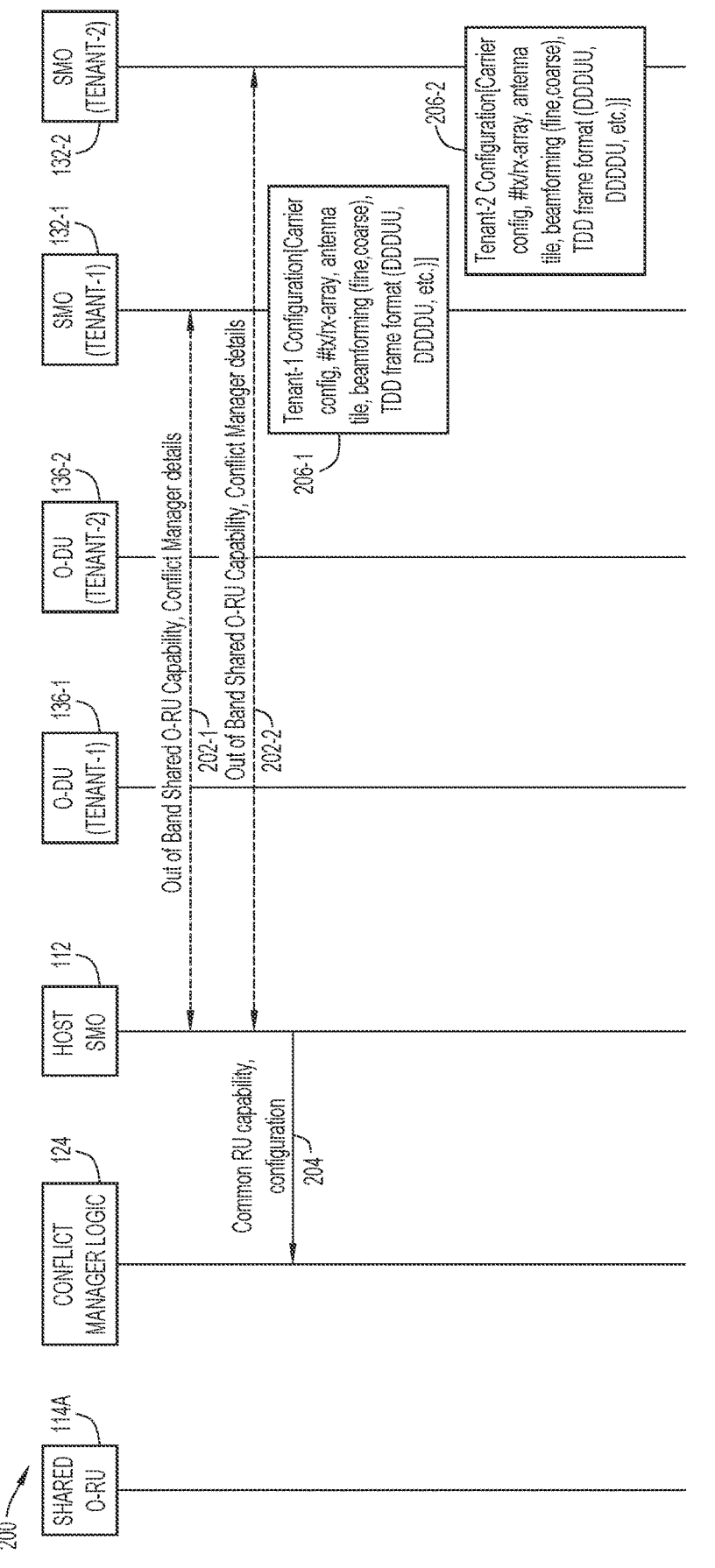
FIGS. 2A and 2B are a message sequence diagram illustrating various example operations that may be performed in order to facilitate conflict management in the shared O-RAN architecture of FIG. 1, according to an example embodiment.
Figure 2B:
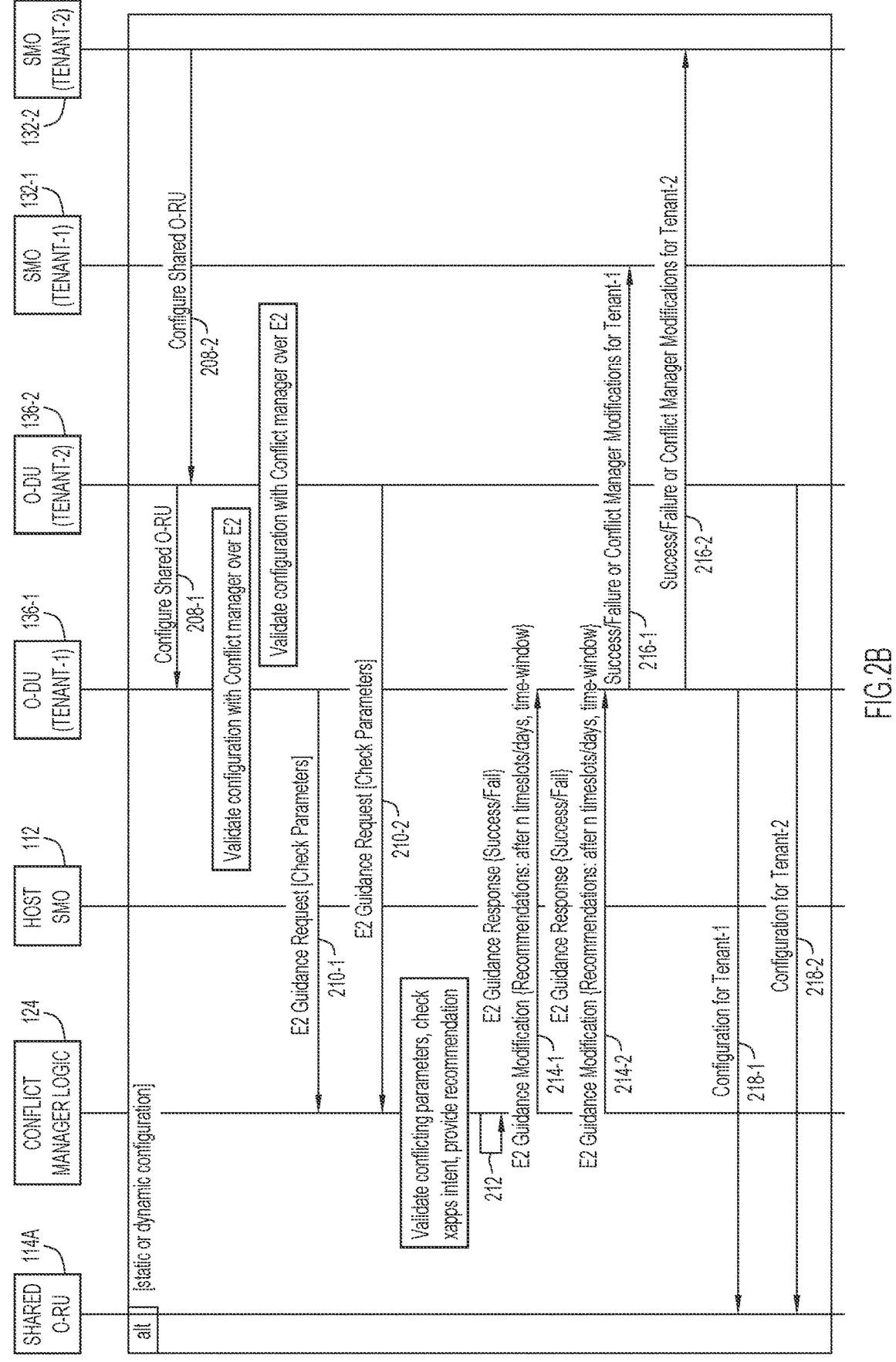

Referring to FIGS. 2A and 2B, FIGS. 2A and 2B are a message sequence diagram illustrating various example operations 200 that may be performed in order to facilitate conflict management in the shared O-RAN architecture of FIG. 1, according to an example embodiment. FIGS. 2A and 2B include shared O-RU 114A of FIG. 1, conflict manager logic 124 (as configured for near-RT RIC 120, not shown in FIGS. 2A and 2B) and host SMO 112 owned/operated or otherwise provided by the host operator of shared O-RAN 110. FIGS. 2A and 2B also include O-DU 136-1 and SMO 132-1 owned/operated or otherwise provided by Tenant-1. FIGS. 2A and 2B also includes O-DU 136-2 and SMO 132-2 owned/operated or otherwise provided by Tenant-2.

As shown at 202-1, in at least one embodiment, host SMO 112 may optionally provide shared O-RU 114A capability information, conflict manager logic 124 details, and/or any other information/configuration details regarding shared O-RAN 110 to SMO 132-1 of Tenant-1 via one or more out-of-band communications/exchanges. Similar optional out-of-band communications/exchanges can be provided by host SMO 112 with SMO 132-2 in at least one embodiment, as shown at 202-2. In at least one embodiment, the out-of-band communications that may optionally be provided may involve providing an Extensible Markup Language (XML) file to tenant SMO(s) that includes various O-RU capability information, conflict management configuration details, etc.

As shown at 204, host SMO 112 sends common shared O-RU capability and/or configuration information for shared O-RU 114A to conflict manager logic 124. In various embodiments, common shared O-RU capability information, conflict management configuration details, etc. may include, but not be limited to, any combination of TDD frame configuration information, relocation of O-RU(s), maximum cumulative gain of O-RU(s) (e.g., where such information may indicate that gain-1 and gain-2 are within limits, but gain-1, gain-2, gain-3, and gain-4 exceed limits), and/or any other applicable information that may be utilized for performing conflict management operations.

As shown at 206-1. SMO 132-1 for Tenant-1 can be configured with (e.g., by a Tenant-1 network admin) and/or otherwise obtain (e.g., from a Tenant-1 configuration database/server) a shared O-RU configuration that is desired by Tenant-1 including various shared O-RU configuration parameters, such as carrier configuration information, frequency bands, number of tx/rx array, antenna tilt and/or azimuth, beamforming (e.g., fine, coarse, etc.), requested gain, TDD frame format (e.g., DDDDU, DDDUU, etc.), combinations thereof, and/or any other applicable shared O-RU configuration information that may be requested/desired by Tenant-1.

As shown at 206-2, SMO 132-2 for Tenant-2 can be configured with (e.g., by a Tenant-2 network admin) and/or otherwise obtain (e.g., from a Tenant-2 configuration database/server) a shared O-RU configuration that is desired by Tenant-2 including various shared O-RU configuration parameters, such as carrier configuration information, frequency bands, number of tx/rx array, antenna tilt and/or azimuth, beamforming (e.g., fine, coarse, etc.), gain, TDD frame format (e.g., DDDDU, DDDUU, etc.), combinations thereof, and/or any other applicable shared O-RU configuration information that may be requested/desired by Tenant-2.

As shown at 208-1, SMO 132-1 for Tenant-1 can trigger O-DU 136-1 for Tenant-1 to initiate configuration of shared O-RU 114A using the shared O-RU configuration/configuration parameters for Tenant-1 as provided at 206-1 (referred to herein for the discussion of FIGS. 2A-2B as "shared O-RU configuration 206-1"). As shown at 208-2, SMO 132-2 for Tenant-2 can trigger O-DU 136-2 for Tenant-2 to initiate configuration of shared O-RU 114A using the shared O-RU configuration/configuration parameters for Tenant-2 as provided at 206-2 (referred to herein for the discussion of FIGS. 2A-2B as "shared O-RU configuration 206-2").

Thereafter, in accordance with embodiments herein, each of corresponding O-DU 136-1 and O-DU 136-2 can initiate a request (via each corresponding enhanced E2 interface 138-1 and 138-2) toward conflict manager logic 124 to validate each of the corresponding shared O-RU configuration parameters for each of corresponding shared O-RU configuration 206-1 and shared O-RU configuration 206-2 in order to determine whether there are any conflicts among the corresponding shared O-RU configuration parameters for each corresponding shared O-RU configuration 206-1 and 206-2.

For example, as shown at 210-1, O-DU 136-1 can send an E2 Guidance Request message to conflict manager logic 124 including the shared O-RU configuration 206-1 requesting conflict manager logic 124 to check/validate the corresponding configuration parameters of the shared O-RU configuration 206-1 for Tenant-1. Similarly, as shown at 210-2, O-DU 136-2 can send an E2 Guidance Request message to conflict manager logic 124 including the shared O-RU configuration 206-2 requesting conflict manager logic 124 to check/validate the corresponding configuration parameters of the shared O-RU configuration 206-2 for Tenant-2.

As shown at 212, the conflict manager logic 124 can check or validate the corresponding requested shared O-RU configurations 206-1 and 206-2 obtained from each of corresponding Tenant-1/O-DU 136-1 and Tenant-2/O-DU 136-2 to determine whether either requested shared O-RU configurations/configuration parameters affects the other tenant's requested configuration/operation and/or may determine whether each requested shared O-RU configuration/configuration parameters is/are permitted for shared O-RAN 110. Additionally, in some embodiments, conflict manager logic 124 can also check to determine whether the corresponding requested shared O-RU configurations 206-1 and 206-2 obtained from each of corresponding Tenant-1/O-DU 136-1 and Tenant-2/O-DU 136-2 may result in any negative outcome, degradation, and/or the like regarding intent/functionality for which the xApps 122A and 122B may be trying to optimize (e.g., which can be identified/provided to conflict manager logic 124 via the information obtained from host SMO 112 at 204).

Based on the determination performed at 212, conflict manager logic 124 may provide a response to each of corresponding O-DU 136-1 (as shown at 214-1) and O-DU 136-2 (as shown at 214-2) an indication of whether each corresponding shared O-RU configuration 206-1 and 206-2 requested by each of corresponding O-DU 136-1 and O-DU 136-2 is allowed (e.g., indicated via ACK or Success indication), is allowed with a recommended modification, or is not allowed (e.g., indicated via a NACK of Failure indication).

In some instances, the conflict manager logic 124 may determine that the corresponding shared O-RU configurations 206-1 and 206-2 requested by each of corresponding O-DU 136-1 and O-DU 136-2 may both be allowed if both were configured for the shared O-RU 114A in accordance with a modification, such as a sharing schedule. Thus, in such instances, conflict manager logic 124 may indicate that the corresponding requested O-RU configurations 206-1 and 206-2 are allowed by providing a response to both O-DU 136-1 (also shown at 214-1) and O-DU 136-2 (also shown at 214-2) that includes a corresponding E2 Guidance Response message including an ACK/success indication along with a corresponding E2 Guidance Modification message that includes a recommendation for a sharing schedule that each corresponding O-DU 136-1 and O-DU 136-2 is to follow/utilize in configuring the shared O-RU 114A (e.g., (Recommendations: after 'n' time slots/days, within one or more time-windows, etc.).

Although not shown in FIG. 2B, in some instances, conflict manager logic 124 may also determine whether any of shared RU configurations 206-1 and 206-2 obtained from any of O-DU 136-1 and 136-2 is not permitted for shared O-RAN 110 (e.g., based on the information obtained from host SMO 112 at 204). Upon determining that a particular shared O-RU configuration obtained from a particular O-DU is not permitted, conflict manager logic 124 can provide a response to the particular O-DU (e.g., E2 Guidance Response (NACK or Failure)) indicating that the particular O-DU node is not allowed to configure the shared O-RU 114A (or all of the shared O-RUs) using the particular shared O-RU configuration requested by the particular O-DU.

Continuing with FIG. 2B, as shown at 216-1, O-DU 136-1 relays the response received from conflict manager logic 124 to SMO 132-1 and, as shown at 216-2, O-DU 136-2 relays the response received from conflict manager logic 124 to SMO 132-2. Thereafter, assuming that both shared O-RU configurations 206-1 and 206-2 are allowed by conflict manager logic 124, potentially in accordance with a recommendation/sharing schedule, O-DU 136-1 can perform configuration of shared O-RU 114A utilizing the shared O-RU configuration 206-1, as shown at 218-1, and O-DU 136-2 can perform configuration of shared O-RU 114A utilizing the shared O-RU configuration 206-2, as shown at 218-2.

Thus, in accordance with embodiments herein, the O-RAN E2 Guidance Procedures can be enhanced to extend outside the near-RT RIC 120 to facilitate conflict management operations to be performed for each of O-DU 136-1 and O-DU 136-2 via each of corresponding E2 interface 138-1 and E2 interface 138-2 facilitating corresponding enhanced E2AP interface communications between each of O-DU 136-1/O-DU 136-2 and conflict manager logic 124 of near-RT RIC 120 as shown in FIGS. 2A-2B. As traffic demand can change (DL/UL mix) and/or of there is a need for a tenant operator to update its shared O-RU configuration, the operations provided in accordance with embodiments herein can be used both statically and dynamically (for static configurations and dynamically updated configurations) to avoid conflicts among shared O-RU configurations requested/sought be the tenant operators as shown in FIGS. 2A-2B.

Referring to FIG. 3. FIG. 3 is a flowchart depicting a method 300 according to an example embodiment. In at least one embodiment, method 300 may be associated with operations that may be utilized to facilitate conflict management in a shared O-RAN architecture, according to an example embodiment. In various embodiments, method 300 may be performed by a computing device or combination of computing devices as discussed for embodiments herein, such as via conflict manager logic configured for a near-real-time RIC (e.g., conflict manager logic 124 of near-RT RIC 120) of a shared RAN (e.g., shared O-RAN 110) including a plurality of RU nodes (e.g., shared O-RUs 114A, 114B, and 114C) in which the shared RAN is operated/owned or otherwise provided by a host operator.

As shown at 302, the method may include obtaining, by a conflict manager of a near-RT RIC (e.g. conflict manager logic 124 of near-RT RIC 120), each of a requested RU configuration from each of a DU node (e.g., O-DU 136-1 and O-DU 136-2) operated by each of a tenant operator (e.g., Tenant-1 and Tenant-2) of a plurality of tenant operators for a plurality of RU nodes that are shared for use among the plurality of tenant operators in which each requested RU configuration comprises RU configuration parameters requested by each DU node.

At 304, the method may include determining, by the conflict manager of the near-RT RIC, whether there are any conflicts among the RU configuration parameters for each requested RU configuration obtained from each DU node.

As shown at 306A, upon determining that there are no conflicts among the RU configuration parameters for each requested RU configuration, providing a response to each DU node indicating that each DU node is allowed to configure the plurality of RU nodes using each requested RU configuration.

However, as shown at 306B, upon determining upon determining one or more conflicts among the RU configuration parameters for each requested RU configuration, the method may include either: providing a response to each DU node indicating that each DU node is allowed to configure the plurality of RU nodes using each requested RU configuration in accordance with a modification, or providing a response to at least one DU node indicating that the at least DU node is not allowed to configure the plurality of RU nodes using a particular requested RU configuration of the at least one DU node, or providing a response to at least one DU node indicating that the at least DU node is not allowed to configure the plurality of RU nodes using a corresponding requested RU configuration of the at least one DU node.

Figure 4:
FIG. 4 is a hardware block diagram of a computing device that may perform functions associated with any combination of operations discussed in connection with techniques described for embodiments herein.

Referring to FIG. 4, FIG. 4 illustrates a hardware block diagram of a computing device 400 that may perform functions associated with operations discussed herein in connection with the techniques depicted via FIGS. 1, 2A, 2B, and 3. In various embodiments, a computing device or apparatus, such as computing device 400 or any combination of computing devices 400, may be configured as any entity/entities as discussed for the techniques depicted in connection with operations illustrated/discussed for various embodiments herein, such as, near-RT RIC 120 including conflict manager logic 124, host SMO 112, SMO 132-1, O-CU 134-1, O-DU 136-1, SMO 132-2, O-CU 134-2, O-DU 136-2, shared O-RU 114A, shared O-RU 114B, shared O-RU 114C, and/or any other elements/functions/nodes discussed herein.

In at least one embodiment, the computing device 400 may be any apparatus that may include one or more processor(s) 402, one or more memory element(s) 404, storage 406, a bus 408, one or more network processor unit(s) 430 interconnected with one or more network input/output (I/O) interface(s) 432, one or more I/O interface(s) 416, and control logic 420. For embodiments in which computing device 400 may be implemented as a near-RT RIC, control logic 420 may include conflict manager logic 422. In various embodiments, instructions associated with logic for computing device 400 can overlap in any manner and are not limited to the specific allocation of instructions and/or operations described herein.

For embodiments in which computing device 400 may be implemented as any device capable of wireless communications (e.g., wireless devices 140-1, wireless devices 140-2, shared O-RUs 114A, 114B, and 114C), computing device 400 may further include at least one baseband processor or modem 410, one or more radio RF transceiver(s) 412 (e.g., any combination of RF receiver(s) and RF transmitter(s)), one or more antenna(s) or antenna array(s) 414.

In at least one embodiment, processor(s) 402 is/are at least one hardware processor configured to execute various tasks, operations and/or functions for computing device 400 as described herein according to software and/or instructions configured for computing device 400. Processor(s) 402 (e.g., a hardware processor) can execute any type of instructions associated with data to achieve the operations detailed herein. In one example, processor(s) 402 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 404 and/or storage 406 is/are configured to store data, information, software, and/or instructions associated with computing device 400, and/or logic configured for memory element(s) 404 and/or storage 406. For example, any logic described herein (e.g., control logic 420, conflict manager logic 422, and conflict manager logic 124) can, in various embodiments, be stored for computing device 400 using any combination of memory element(s) 404 and/or storage 406. Note that in some embodiments, storage 406 can be consolidated with memory element(s) 404 (or vice versa) or can overlap/exist in any other suitable manner.

In at least one embodiment, bus 408 can be configured as an interface that enables one or more elements of computing device 400 to communicate in order to exchange information and/or data. Bus 408 can be implemented with any architecture designed for passing control, data and/or information between processors, memory elements/storage, peripheral devices, and/or any other hardware and/or software components that may be configured for computing device 400. In at least one embodiment, bus 408 may be implemented as a fast kernel-hosted interconnect, potentially using shared memory between processes (e.g., logic), which can enable efficient communication paths between the processes.

In various embodiments, network processor unit(s) 430 may enable communication between computing device 400 and other systems, entities, etc., via network I/O interface(s) 432 (wired and/or wireless) to facilitate operations discussed for various embodiments described herein. In various embodiments, network processor unit(s) 430 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between computing device 400 and other systems, entities, etc. to facilitate operations for various embodiments described herein. In various embodiments, network I/O interface(s) 432 can be configured as one or more Ethernet port(s), Fibre Channel ports, any other I/O port(s), and/or antenna(s)/antenna array(s) now known or hereafter developed. Thus, the network processor unit(s) 430 and/or network I/O interface(s) 432 may include suitable interfaces for receiving, transmitting, and/or otherwise communicating data and/or information (wired and/or wirelessly) in a network environment.

I/O interface(s) 416 mallow for input and output of data and/or information with other entities that may be connected to computing device 400. For example, I/O interface(s) 416 may provide a connection to external devices such as a keyboard, keypad, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

For embodiments in which computing device 400 is implemented as a wireless device or any apparatus capable of wireless communications, the RF transceiver(s) 412 may perform RF transmission and RF reception of wireless signals via antenna(s)/antenna array(s) 414, and the baseband processor or modem 410 performs baseband modulation and demodulation, etc. associated with such signals to enable wireless communications for computing device 400.

In various embodiments, control logic 420 and, if provided, conflict manager logic 422, can include instructions that, when executed, cause processor(s) 402 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 420) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, any entity or apparatus as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 404 and/or storage 406 can store data, software, code, instructions (e.g., processor instructions), logic, parameters, combinations thereof, and/or the like used for operations described herein. This includes memory element(s) 404 and/or storage 406 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable.

For example, a removable hard drive may be used for memory/storage in some implementations. Other examples may include optical and magnetic disks, thumb drives, and smart cards that can be inserted and/or otherwise connected to a computing device for transfer onto another computer readable storage medium.

In one form, a computer-implemented method performed by a conflict manager of a near-real-time radio access network (RAN) intelligent controller (near-real-time RIC) of a shared RAN including a plurality of radio unit (RU) nodes in which the shared RAN is provided by a host operator may be provided in which the method includes obtaining each of a requested RU configuration from each of a distributed unit (DU) node operated by each of a tenant operator of a plurality of tenant operators for the plurality of RU nodes that are shared for use among the plurality of tenant operators, wherein each requested RU configuration comprises RU configuration parameters requested by each DU node; determining whether there are any conflicts among the RU configuration parameters for each requested RU configuration obtained from each DU node; upon determining no conflicts among the RU configuration parameters for each requested RU configuration, providing a response to each DU node indicating that each DU node is allowed to configure the plurality of RU nodes using each requested RU configuration; and upon determining one or more conflicts among the RU configuration parameters for each requested RU configuration, either: providing a response to each DU node indicating that each DU node is allowed to configure the plurality of RU nodes using each requested RU configuration in accordance with a modification; or providing a response to at least one DU node indicating that the at least DU node is not allowed to configure the plurality of RU nodes using a corresponding requested RU configuration of the at least one DU node. The conflict manager of the near-real-time RIC directly interfaces with each DU node via a corresponding interface with each DU node. In one instance, the corresponding interface with each DU node is a corresponding Open Radio Access Network (O-RAN) E2AP interface with each DU node. The plurality of tenant operators are different from each other and are each different than the host operator.

In one instance, the determining includes determining any conflicts among each requested RU configuration obtained from each DU node and among any RU configurations for any applications operating at the near-real-time RIC.

In one instance, the method further includes determining whether any requested RU configuration obtained from any DU node is not permitted; and upon determining that a particular requested RU configuration obtained from a particular DU node is not permitted, providing a response to the particular DU node indicating that the particular DU node is not allowed to configure the plurality of RU nodes using the particular requested RU configuration.

In one instance, the modification is a sharing schedule that each DU node is to follow in configuring the plurality of RU nodes using each requested RU configuration. In one instance, the sharing schedule identifies one or more of: one or more time slots that each DU node is to use in configuring the plurality of RU nodes using each requested RU configuration; or one or more days that each DU node is to use in configuring the plurality of RU nodes using each requested RU configuration. In one instance, each DU node is an Open Radio Access Network DU (O-DU) node, and the plurality of RU nodes are a plurality of Open Radio Access Network DU (O-RU) nodes.

Variations and Implementations

For a disaggregated RAN architecture, such as a disaggregated shared RAN architecture (e.g., shared O-RAN 110), base station functionality can be split into a CU, one or more DUs, and one or more DUs. Further disaggregation may include separation of the CU into a Central Unit Control Plane (CU-CP) component and a Central Unit User Plane (CU-UP) component. In some instances, such elements may be implemented as O-RAN elements/functions, such as an O-CU, O-DU(s), and O-RU(s).

An RU (or O-RU), may terminate any combination of a wireless wide area (WWA) (e.g., cellular) and/or wireless local area (WLA) (e.g., Wi-Fi®) air interface for any combination of Radio Access Technology (RAT) types (sometimes referred to more generally as 'accesses') for a disaggregated RAN architecture such as, but not limited to: 3GPP licensed spectrum accesses (e.g., 3rd Generation (3G), 4G/LTE, 5G, and/or next Generation (nG) accesses); 3GPP unlicensed spectrum accesses (e.g., Licensed-Assisted Access (LAA), enhanced LAA (eLAA), further enhanced LAA (feLAA), and New Radio Unlicensed (NR-U)); non-3GPP unlicensed spectrum accesses such as Institute of Electrical and Electronics Engineers (IEEE) 802.11 (e.g., Wi-Fi®); IEEE 802.16 (e.g., WiMAX®), Near Field Communications (NFC), Bluetooth®, and/or the like; Citizens Broadband Radio Service (CBRS) accesses; combinations thereof; and/or the like.

Thus, an RU (or O-RU for an O-RAN architecture) may be inclusive of any configuration/combination of 3GPP 4G/LTE evolved Node Bs (eNBs or eNodeBs), 5G next Generation Node Bs (gNBs or gNodeBs), and/or any other next Generation access nodes that may include hardware and/or software to perform baseband signal processing (such as modulation/demodulation) as well as hardware (e.g., baseband processors (modems), transmitters and receivers, transceivers, and/or the like), software, logic and/or the like to facilitate signal transmissions and signal receptions via antenna assemblies (not shown) in order to provide over-the-air RF coverage for one or more access types (e.g., 4G/LTE, 5G, nG, CBRS, etc.) through which one or more wireless devices may utilize to connect to one or more RUs for one or more sessions (e.g., voice, video, data, gaming, combinations thereof, etc.). More generally, an RU may perform lower Physical (PHY) layer and RF operations to facilitate RF connections with one or more wireless devices.

A DU (or O-DU for an O-RAN architecture), also sometimes referred to as a baseband unit, may provide control/management operations and radio signal processing operations for each of one or more RUs (or O-RUs for an O-RAN architecture). Generally, control/management operations that may be provided by a DU for each of one or more RUs may include controlling/managing frequency allocation, bandwidth, cell identifier configuration (including Physical Cell Identifiers (PCIs) and Cell Global Identifiers (CGIs), cell broadcast information (to be included in a broadcast Master Information Block (MIB) and/or System Information Block(s) (SIB(s)), Sounding Reference Signal (SRS) configuration, TDD frame format configuration, beamforming parameters, radio or spectral resources for Physical Resource Blocks (PRBs), and/or the like for each RU. Generally, radio signal processing operations provided by a DU for each of one or more RU (homed to the DU) may include, but not be limited to, lower level operations of the radio signal processing stack, such as Radio Link Control (RLC), Medium Access Control (MAC), and higher PHY layer operations, such as digital processing, including signal modulation and demodulation, channel encoding and decoding, and scheduling, among others.

A CU (or O-CU for an O-RAN architecture) may provide upper-level operations of a radio signal processing stack, such as user plane Packet Data Convergence Protocol (PDCP) functions and user plane Service Data Adaptation Protocol (SDAP), among others. The split of operations of a radio signal processing stack among between a DU a CU can be varied depending on implementation and/or configuration of a given RAN architecture. In some instances, a CU can also provide operations for DU(s) via Resource Control (RRC) functions and the control plane part of the PDCP protocol. In some embodiments, a CU may be further disaggregated into a CU-CP component and a CU-UP component.

A wireless device, such as wireless devices 140-1 and 140-2, and any other wireless devices discussed herein, may be considered any electronic device, user equipment (UE), etc. that initiates a connection or communication session with a corresponding core network, and may be inclusive of but not limited to a computer, a mobile phone or mobile communication device, an electronic tablet, a laptop, etc. an electronic device such as an industrial device (e.g., a robot), automation device, enterprise device, appliance, Internet of Things (IoT) device (e.g., sensor, monitor, meter (parking meter, gas meter, water meter, etc.), traffic light, camera/surveillance device, smart device, etc.), a router with a WWA/WLA interface, a WWA/WLA (cellular/Wi-Fi®) enabled device. and/or any other device, component, element, or object capable of initiating voice, audio, video, media, or data exchanges within a system. Thus, a wireless device may include any hardware and/or software to perform baseband signal processing (such as modulation/demodulation) as well as hardware (e.g., baseband processors (modems), transmitters and receivers, transceivers, and/or the like), software, logic and/or the like to facilitate signal transmissions and signal receptions via antenna assemblies (not shown) in order to connect to one or more radio nodes of a RAN, for one or more sessions with one or more core networks for any appropriate communications that may be exchanged with one or more data networks.

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

In various example implementations, any entity or apparatus for various embodiments described herein can encompass network elements (which can include virtualized network elements, functions, etc.) such as, for example, network appliances, forwarders, routers, servers, switches, gateways, bridges, loadbalancers, firewalls, processors, modules, radio receivers/transmitters, or any other suitable device, component, element, or object operable to exchange information that facilitates or otherwise helps to facilitate various operations in a network environment as described for various embodiments herein. Note that with the examples provided herein, interaction may be described in terms of one, two, three, or four entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Each example embodiment disclosed herein has been included to present one or more different features. However, all disclosed example embodiments are designed to work together as part of a single larger system or method. This disclosure explicitly envisions compound embodiments that combine multiple previously discussed features in different example embodiments into a single system or method.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method performed by a conflict manager of a near-real-time radio access network (RAN) intelligent controller (near-real-time RIC) of a shared RAN including a plurality of radio unit (RU) nodes in which the shared RAN is provided by a host operator, the method comprising:

obtaining each of a requested RU configuration from each of a distributed unit (DU) node operated by each of a tenant operator of a plurality of tenant operators for the plurality of RU nodes that are shared for use among the plurality of tenant operators, wherein each requested RU configuration comprises RU configuration parameters requested by each DU node;

determining whether there are any conflicts among the RU configuration parameters for each requested RU configuration obtained from each DU node;

upon determining no conflicts among the RU configuration parameters for each requested RU configuration, providing a response to each DU node indicating that each DU node is allowed to configure the plurality of RU nodes using each requested RU configuration; or upon determining one or more conflicts among the RU configuration parameters for each requested RU configuration, either:

providing a response to each DU node indicating that each DU node is allowed to configure the plurality of RU nodes using each requested RU configuration in accordance with a modification; or providing a response to at least one DU node indicating that the at least one DU node is not allowed to configure the plurality of RU nodes using a corresponding requested RU configuration of the at least one DU node.

2. The method of claim 1, wherein the conflict manager of the near-real-time RIC directly interfaces with each DU node via a corresponding interface with each DU node.

3. The method of claim 2, wherein the corresponding interface with each DU node is a corresponding Open Radio Access Network (O-RAN) E2AP interface with each DU node.

4. The method of claim 1, wherein the determining includes determining any conflicts among each requested RU configuration obtained from each DU node and among any RU configurations for any applications operating at the near-real-time RIC.

5. The method of claim 1, further comprising:

determining whether any requested RU configuration obtained from any DU node is not permitted; and upon determining that a particular requested RU configuration obtained from a particular DU node is not permitted, providing a response to the particular DU node indicating that the particular DU node is not allowed to configure the plurality of RU nodes using the particular requested RU configuration.

6. The method of claim 1, wherein the modification is a sharing schedule that each DU node is to follow in configuring the plurality of RU nodes using each requested RU configuration.

7. The method of claim 6, wherein the sharing schedule identifies one or more of:

one or more time slots that each DU node is to use in configuring the plurality of RU nodes using each requested RU configuration; or one or more days that each DU node is to use in configuring the plurality of RU nodes using each requested RU configuration.

8. The method of claim 1, wherein each DU node is an Open Radio Access Network DU (O-DU) node, and the plurality of RU nodes are a plurality of Open Radio Access Network DU (O-RU) nodes.

9. The method of claim 1, wherein the plurality of tenant operators are different from each other and are each different than the host operator.

10. One or more non-transitory computer readable storage media encoded with instructions that, when executed by a processor of a conflict manager of a near-real-time radio access network (RAN) intelligent controller (near-real-time RIC) of a shared RAN including a plurality of radio unit (RU) nodes in which the shared RAN is provided by a host operator, cause the processor to perform operations, comprising:

> obtaining each of a requested RU configuration from each of a distributed unit (DU) node operated by each of a tenant operator of a plurality of tenant operators for the plurality of RU nodes that are shared for use among the plurality of tenant operators, wherein each requested RU configuration comprises RU configuration parameters requested by each DU node;

> determining whether there are any conflicts among the RU configuration parameters for each requested RU configuration obtained from each DU node;

> upon determining no conflicts among the RU configuration parameters for each requested RU configuration, providing a response to each DU node indicating that each DU node is allowed to configure the plurality of RU nodes using each requested RU configuration; or > upon determining one or more conflicts among the RU configuration parameters for each requested RU configuration, either:

>> providing a response to each DU node indicating that each DU node is allowed to configure the plurality of RU nodes using each requested RU configuration in accordance with a modification; or >> providing a response to at least one DU node indicating that the at least one DU node is not allowed to configure the plurality of RU nodes using a corresponding requested RU configuration of the at least one DU node.

11. The media of claim 10, wherein the determining includes determining any conflicts among each requested RU configuration obtained from each DU node and among any RU configurations for any applications operating at the near-real-time RIC.

12. The media of claim 10, wherein the instructions, when executed by the processor, cause the processor to perform further operations, comprising:

> determining whether any requested RU configuration obtained from any DU node is not permitted; and > upon determining that a particular requested RU configuration obtained from a particular DU node is not permitted, providing a response to the particular DU node indicating that the particular DU node is not allowed to configure the plurality of RU nodes using the particular requested RU configuration.

13. The media of claim 10, wherein the modification is a sharing schedule that each DU node is to follow in configuring the plurality of RU nodes using each requested RU configuration.

14. The media of claim 13, wherein the sharing schedule identifies one or more of:

> one or more time slots that each DU node is to use in configuring the plurality of RU nodes using each requested RU configuration; or > one or more days that each DU node is to use in configuring the plurality of RU nodes using each requested RU configuration.

15. A conflict manager of a near-real-time radio access network (RAN) intelligent controller (near-real-time RIC) of a shared RAN including a plurality of radio unit (RU) nodes in which the shared RAN is provided by a host operator, comprising:

> at least one memory element for storing data; and

> at least one processor for executing instructions associated with the data, wherein executing the instructions causes the conflict manager to perform operations, comprising:

>> obtaining each of a requested RU configuration from each of a distributed unit (DU) node operated by each of a tenant operator of a plurality of tenant operators for the plurality of RU nodes that are shared for use among the plurality of tenant operators, wherein each requested RU configuration comprises RU configuration parameters requested by each DU node;

>> determining whether there are any conflicts among the RU configuration parameters for each requested RU configuration obtained from each DU node;

>> upon determining no conflicts among the RU configuration parameters for each requested RU configuration, providing a response to each DU node indicating that each DU node is allowed to configure the plurality of RU nodes using each requested RU configuration; or >> upon determining one or more conflicts among the RU configuration parameters for each requested RU configuration, either:

>>> providing a response to each DU node indicating that each DU node is allowed to configure the plurality of RU nodes using each requested RU configuration in accordance with a modification; or >>> providing a response to at least one DU node indicating that the at least one DU node is not allowed to configure the plurality of RU nodes using a corresponding requested RU configuration of the at least one DU node.

16. The conflict manager of claim 15, wherein the conflict manager of the near-real-time RIC directly interfaces with each DU node via a corresponding interface with each DU node.

17. The conflict manager of claim 16, wherein the corresponding interface with each DU node is a corresponding Open Radio Access Network (O-RAN) E2AP interface with each DU node.

18. The conflict manager of claim 15, wherein the determining includes determining any conflicts among each requested RU configuration obtained from each DU node and among any RU configurations for any applications operating at the near-real-time RIC.

19. The conflict manager of claim 15, wherein executing the instructions causes the conflict manager to perform further operations, comprising:

> determining whether any requested RU configuration obtained from any DU node is not permitted; and > upon determining that a particular requested RU configuration obtained from a particular DU node is not permitted, providing a response to the particular DU node indicating that the particular DU node is not allowed to configure the plurality of RU nodes using the particular requested RU configuration.

20. The conflict manager of claim 15, wherein the modification is a sharing schedule that each DU node is to follow in configuring the plurality of RU nodes using each requested RU configuration.

\* \* \* \* \*